H. DISTELRATH.
GAGE-COCK.
No. 193,231. Patented July 17, 1877.
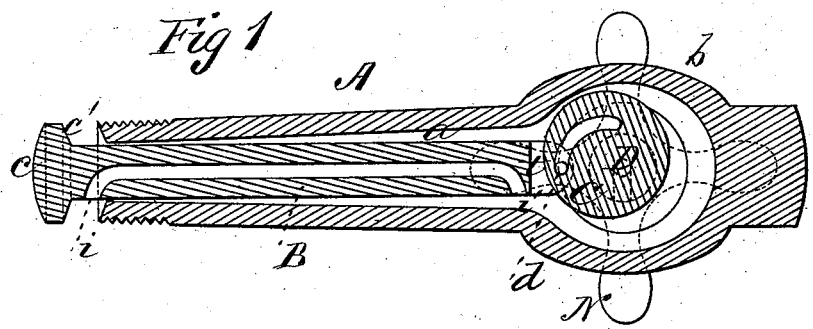
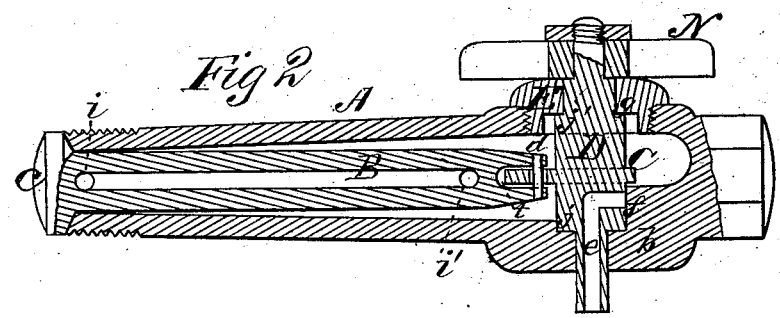
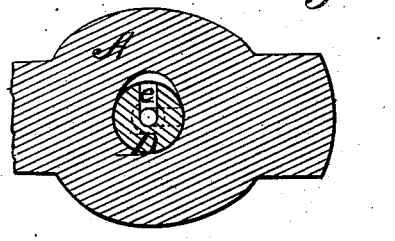
WITNESSES
Villette Anderson
Francis J. Masi
INVENTOR
Henry Distelrath,
by E. W. Anderson,
ATTORNEY

UNITED STATES PATENT OFFICE.

HENRY A. DISTELRATH, OF COLUMBUS, OHIO.

IMPROVEMENT IN GAGE-COCKS.

Specification forming part of Letters Patent No. 193,231, dated July 17, 1877; application filed May 2, 1877.

*To all whom it may concern:*

Be it known that I, HENRY A. DISTELRATH, of Columbus, in the county of Franklin and State of Ohio, have invented a new and valuable Improvement in Steam and Water Gages; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a sectional view of my invention, showing the inner tube extended. Fig. 2 is a like view thereof with the same retracted, and Fig. 3 is a detail sectional view.

This invention has relation to improvements in water and steam gage-cocks for boilers; and it consists in the construction thereof hereinafter more fully set forth.

In the annexed drawings, the letter A indicates the outside casing of my improved cock, having a tubular bore, $a$, and provided near its outer end with a bowl or enlargement, $b$.

B represents an inside tube, having at its outer end a boss or head, $c$, with a preferably conical rear end, $c'$, conforming to a corresponding recess in the boiler-end of the outer casing. This tube has free endwise movement in the bore of the casing aforesaid, and when it is thrust into said casing until its head fits snugly against the end of the same, its induct end $i$ will be inside of said casing and access of steam or water will be cut off therefrom. As shown in Figs. 1 and 2, the exit end or aperture $i'$ of said tube falls somewhat short of the inner end thereof. This end is provided with a slot, $t$, and is connected with a slotted eccentric, C, by means of a pin, $d$. This eccentric is keyed or otherwise secured or formed on an operating-shaft, D, journaled in the bowl aforesaid, and provided with a passage, $e$, opening at one end in said bowl, and at its other outside thereof.

Shaft D is shouldered or rabbeted at each end, as shown at $j\ j'$, Fig. 2, and these shoulders are received and have tight bearings, respectively, in a recess, $f$, formed in the under side of enlargement $b$ aforesaid, and in a recess, $g$, that is formed in a removable screw-cap, E, applied in an aperture, having proper screw-threads, in the upper side of said enlargement.

The upper or induct end of the passage $e$ is about midway of the shoulder $j$ aforesaid on the eccentric-shaft D.

When the outer casing is applied, in the customary manner, to a boiler, and the eccentric-shaft operated to throw the inner tubing out of the said casing, steam or water, as may happen, will pass through induct end $i$ of the said tube, through it into the hollow of the bowl or enlargement, whence it will pass into the induct end of passage $e$, downward out of the eccentric-shaft. If water is above the level of the gage-cock, the discharge will necessarily be water; but if below, steam. The condition of the water in the boiler being ascertained, by reversing the movement of the eccentric-shaft, the tube B will be drawn into the casing until its boss $c$ is in close contact with the end of the same, and its induct end inside thereof, when the passage of steam through the cock will be arrested. In this position the boss will bear forcibly against the boiler end of the casing, and will exclude both steam and water, and relieve the working parts of the device, the eccentric, and its shaft of all strain. As aforesaid, the shouldered rabbets $j\ j'$ form close joints, respectively, with the recess $f$ and screw-cap E, no packing being required, and should a leak occur it may be immediately stopped by giving a slight turn to the cap. Shaft D will be operated by the usual hand-wheel N.

What I claim as new, and desire to secure by Letters Patent, is—

The combination, with the conically-recessed tubular casing A, of the inner tube B, having conical boss $c$ fitting in said recess, and its induct-opening $i$ in front of said boss, the eccentric C, and the operating-shaft D, having exit-passage $e$, substantially as specified.

In testimony that I claim the above I have hereunto subscribed my name in the presence of two witnesses.

HENRY A. DISTELRATH.

Witnesses:
JAMES COONEY,
JOHN P. REMMY.